INVENTOR:
HOWARD W. DYSON
BY Howson & Howson
ATTYS.

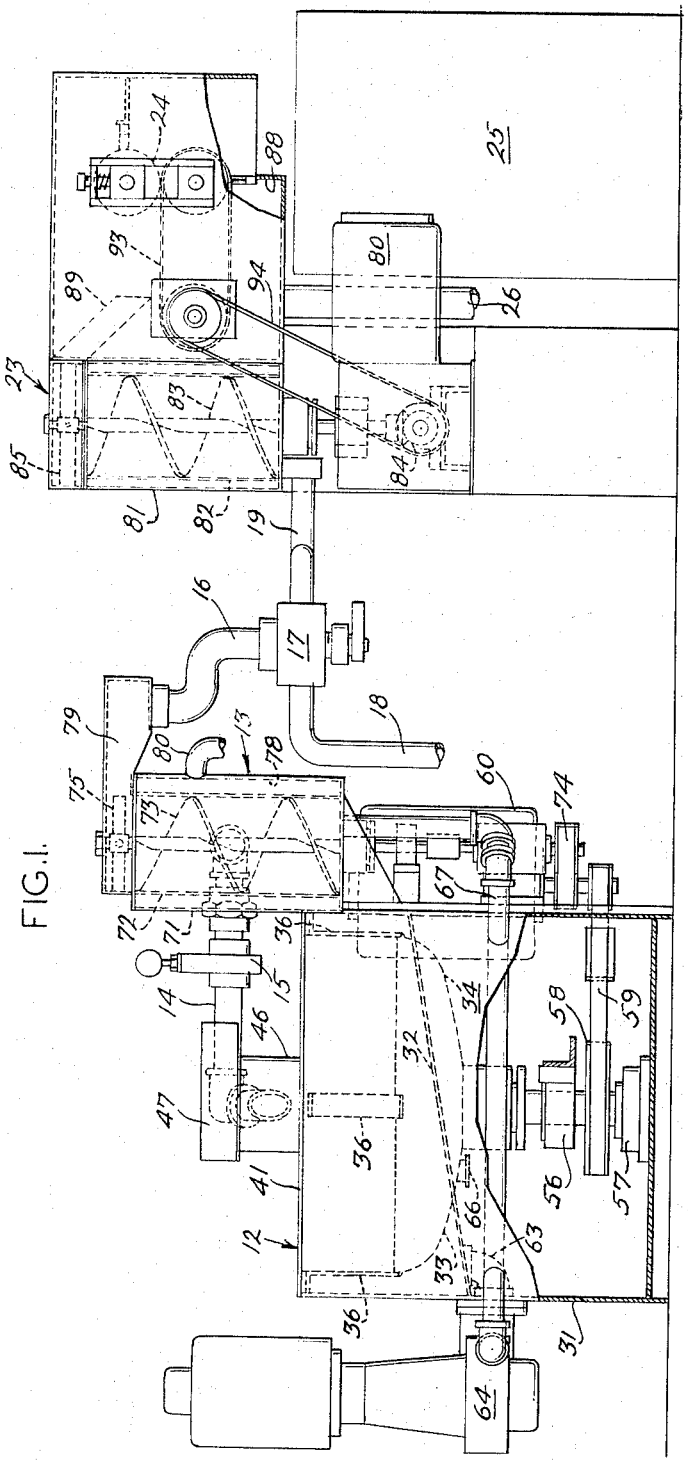

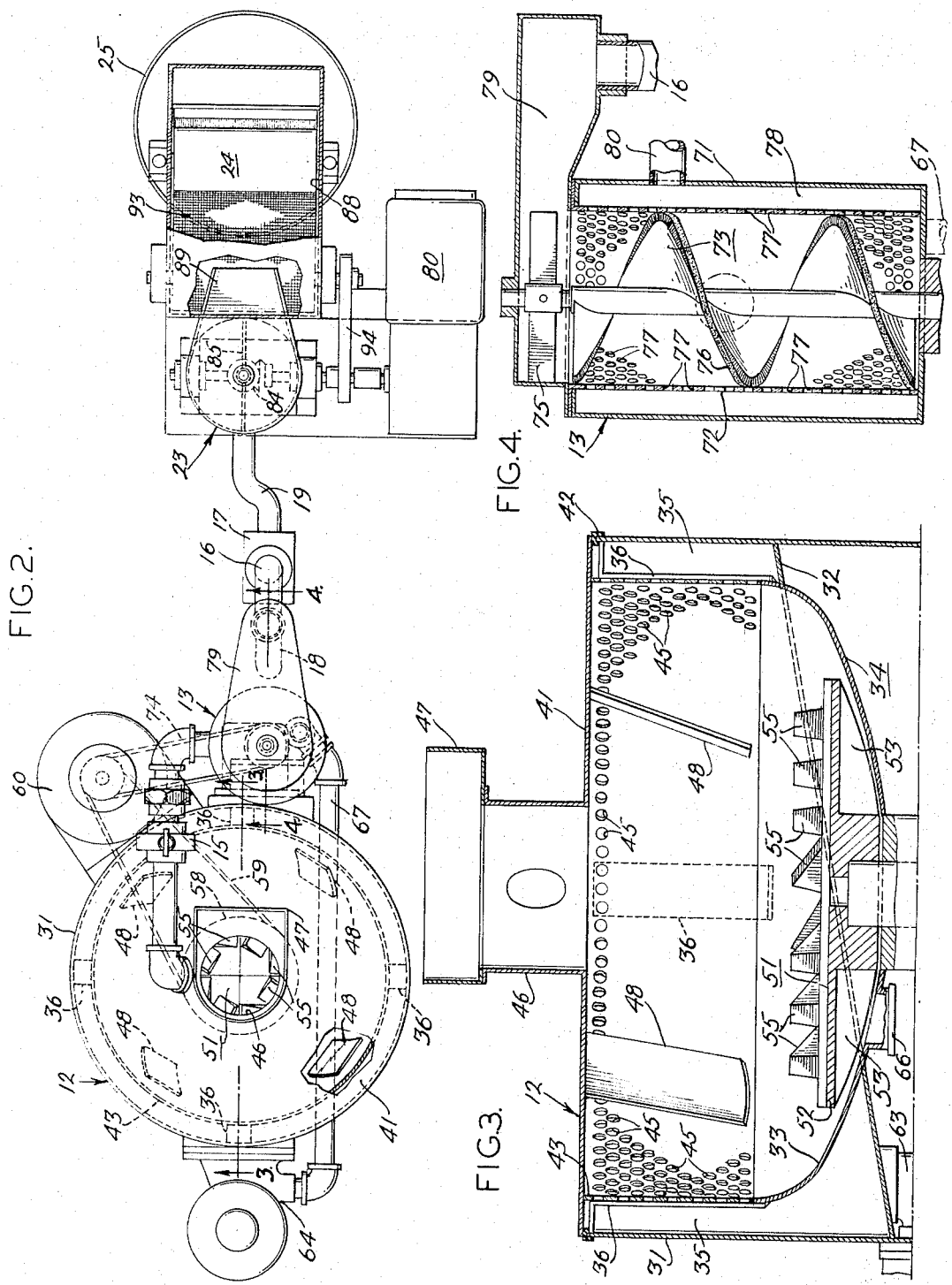

April 2, 1968

H. W. DYSON 3,375,776

DISINTEGRATING MATERIAL IN A LIQUID CARRIER
AND SEPARATING THE SAME

Filed July 1, 1965

INVENTOR:
HOWARD W. DYSON

BY Howson & Howson

ATTYS.

INVENTOR:
HOWARD W. DYSON
BY
Howdon & Howdon
ATTYS.

INVENTOR:
HOWARD W. DYSON
BY
Howson & Howson
ATTYS.

United States Patent Office 3,375,776
Patented Apr. 2, 1968

3,375,776
DISINTEGRATING MATERIAL IN A LIQUID CARRIER AND SEPARATING THE SAME
Howard W. Dyson, 113 Bala Ave., Oreland, Pa. 19075
Filed July 1, 1965, Ser. No. 468,738
17 Claims. (Cl. 100—72)

ABSTRACT OF THE DISCLOSURE

Apparatus including a distintegrator and a separator. The disintegrator has an impeller with replaceable disintegrating teeth to form a slurry with a liquid carrier. A replaceable sizing screen surrounds the impeller to discharge the slurry to a single or multiple separator where the carrier may be either separated and returned to the disintegrator, or may be discharged with the material. In the separator, the separation is made by a screw rotating in a foraminous shell. Several forms of separators are shown, in some of which the screw is confined to the upper section. The shell is generally cylindrical, either straight or tapered, or both; and brushes are provided to maintain the perforations in the shell clear of the separated material.

---

The present invention relates to disintegration apparatus and more particularly to improvements in disintegration apparatus of the type shown in my U.S. Patent No. 3,191,872, granted June 29, 1965.

Apparatus in accordance with the invention of my earlier patent operates to receive material such as paper, cardboard, garbage, certain plastics, glass, ceramic waste and other synthetic and natural materials and to reduce the same to a free-flowing slurry of pulp or the like. The slurry may be dewatered for disposal, may be discharged without dewatering, or may be otherwise treated to form a semi-dry, or dry pulp which may be used as a filler in plastic compositions for the production of molded articles of various character. The apparatus has particular utility in installations where it is desired to reduce the bulk of the waste material to a minimum for easy disposal, and particularly in installations where a wide variety of waste material must be disposed of.

Although apparatus of the aforementioned patent is capable of distintegrating a wide variety of materials, it cannot disintegrate certain materials such as iron castings, substantial pieces of metal, and the like. Consequently, it sometimes occurs that the apparatus is damaged when such materials are deposited into it, and it is then necessary to replace and repair the damaged parts. The present invention provides an improved construction which facilitates the replacement and repair of damaged or worn parts of the disintegrating apparatus.

The apparatus of the invention disintegrates the material to a size such that it may flow through the apertures therein. The smaller the apertures in the apparatus, the smaller the particle size to which the material is disintegrated. The greater the disintegration, the more time required, and it is therefore desirable to provide means for changing the aperture size. For example, when destroying "secret" and other classified waste, the particle size must be at a minimum whereas when destroying or disintegrating other waste, larger particle sizes are permissible, The present invention provides an improved construction whereby alteration of the aperture size in the apparatus is simplified.

In many cases, it is desirable to recirculate the water through the unit in order to conserve water, the disintegrated material being separated from the water prior to recirculation of the latter. In other cases, it is not desired to separate the disintegrated material from the water and the unit is supplied continuously with water. For example, in shipboard trash room installations, while at sea, it is possible to discharge the waste material overboard while it is in the form of a slurry and there is an ample supply of water to operate the apparatus. In port, however, the waste material should not be discharged overboard, but must be separated from the water and collected for other disposal. The present invention provides apparatus susceptible for use on shipboard which operates alternatively to discharge the slurry overboard, using sea water for the operation of the unit; and to separate the disintegrated particles from the slurry and recirculate the water into the disintegrating tank of the apparatus.

In shipboard galley installations, fresh water must be used in the disintegrating apparatus to avoid contamination, and the water should be recirculated by separated from the slurry. While at sea, the remaining pulp should be fluid enough to flow through the waste lines; whereas in port, the pulp should be deliquefied to the maximum extent to afford easy disposal. The present invention provides apparatus which is highly effective for this purpose.

The present invention provides a disposal system which has universal application and including various types of separators which are operable to discharge the pulp into a container or other receptacle in the desired condition of wetness.

All of the objects of the invention are more fully set forth hereinafter with reference to the accompanying drawings wherein:

FIG. 1 is a view in side elevation with portions broken away illustrating one embodiment of apparatus made in accordance with the present invention;

FIG. 2 is a plan view of the apparatus shown in FIG. 1;

Figure 5:
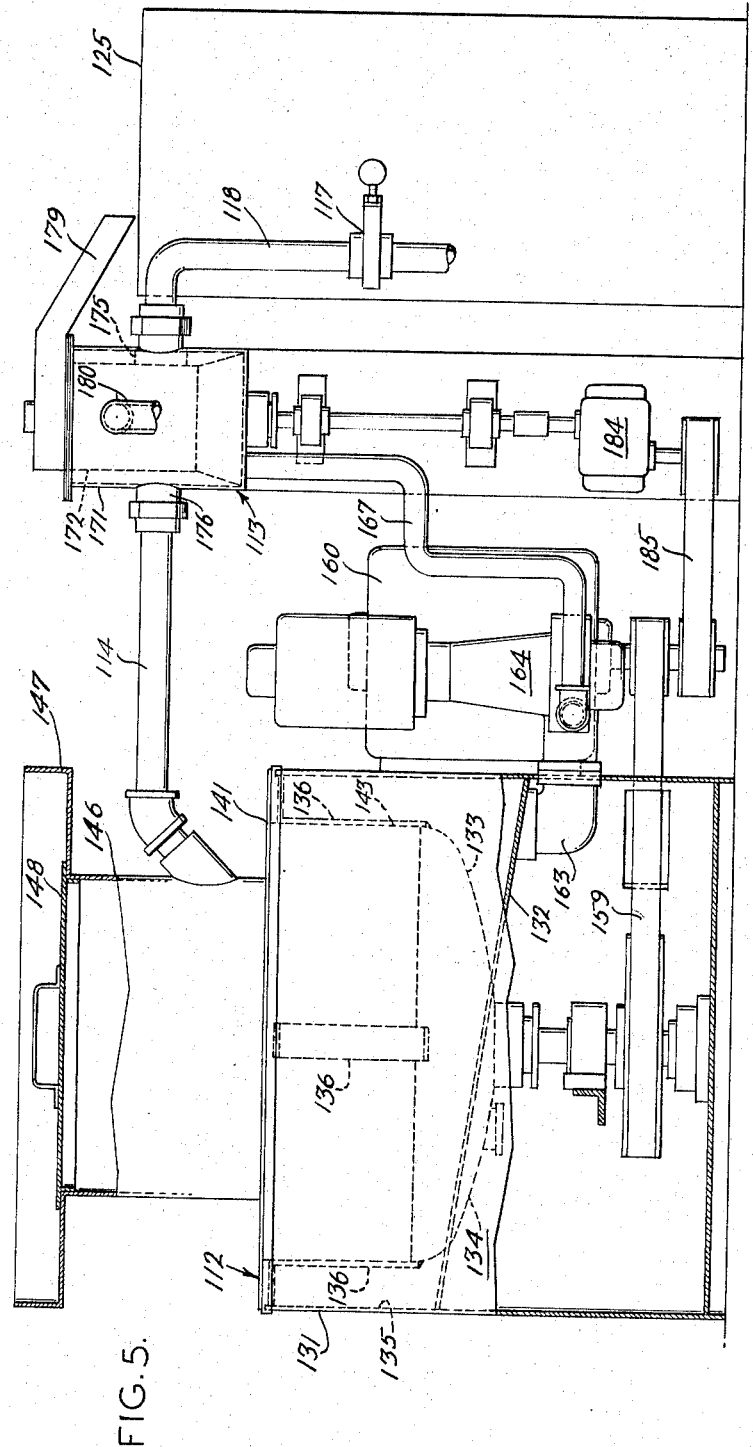
Figure 6:
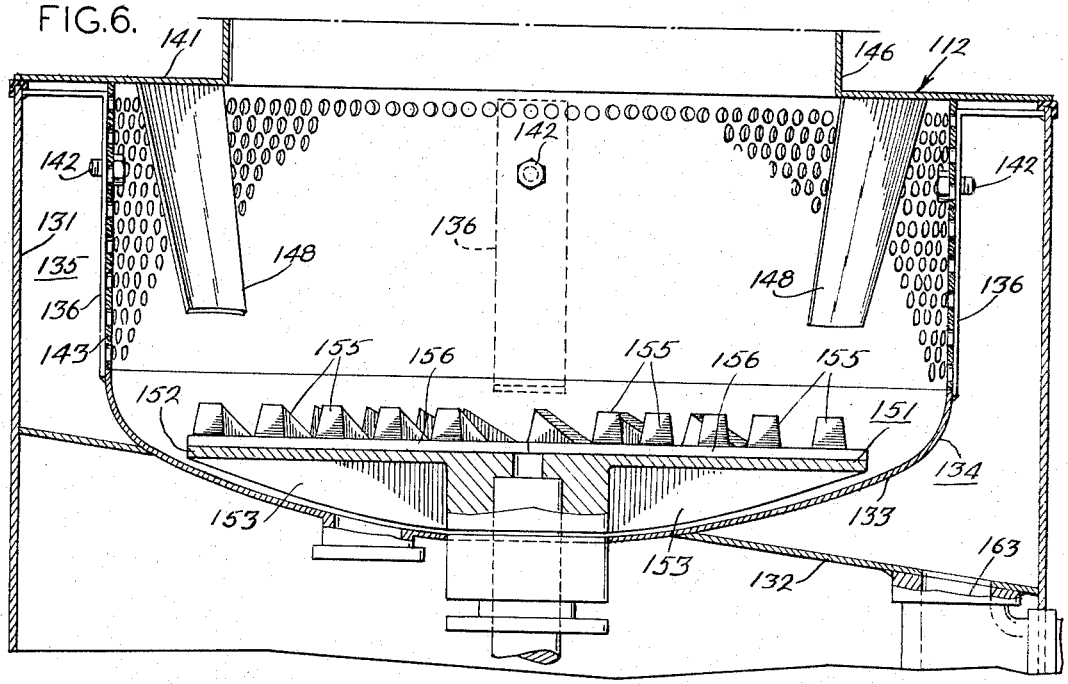
Figure 7:
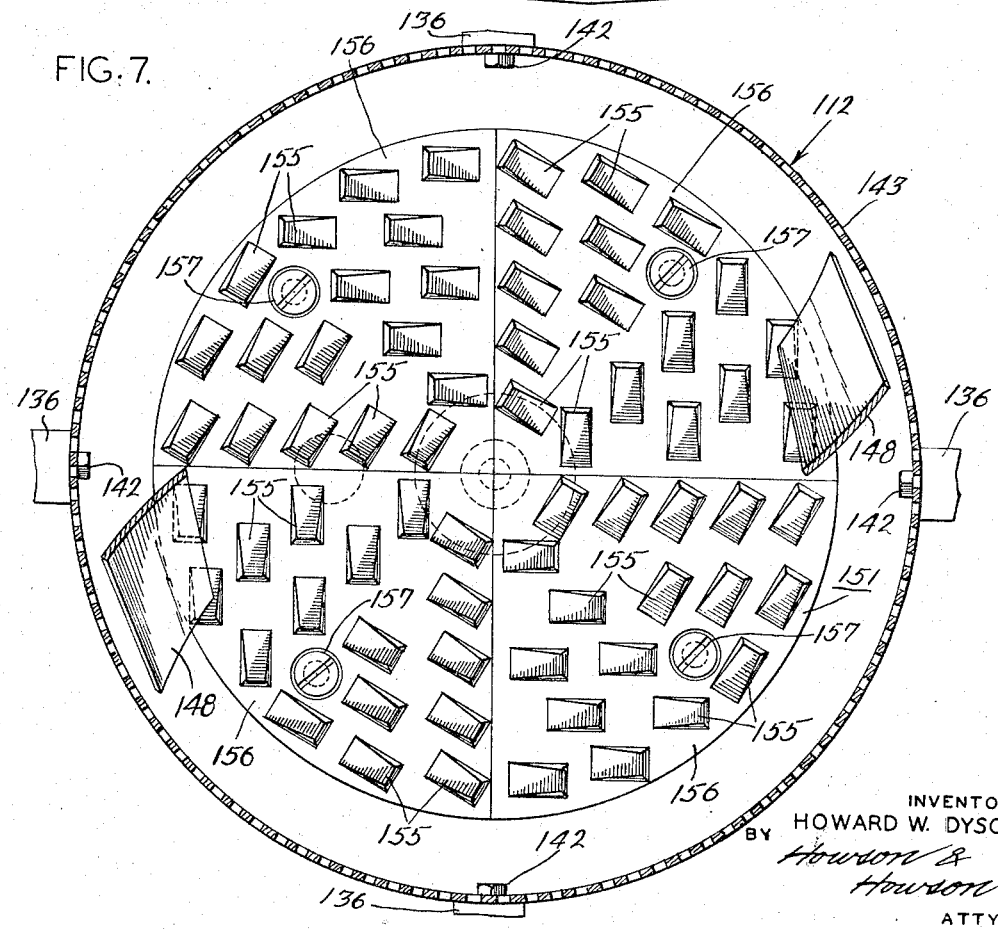
Figure 8:
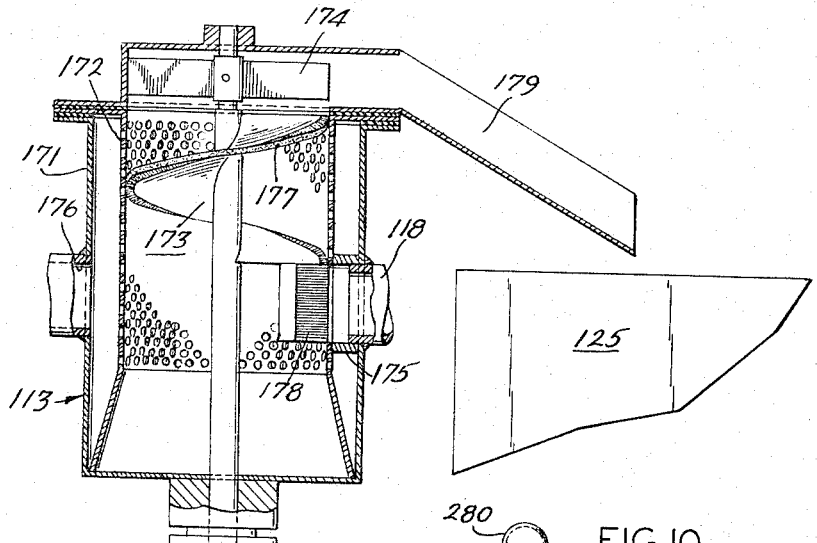
Figure 10:
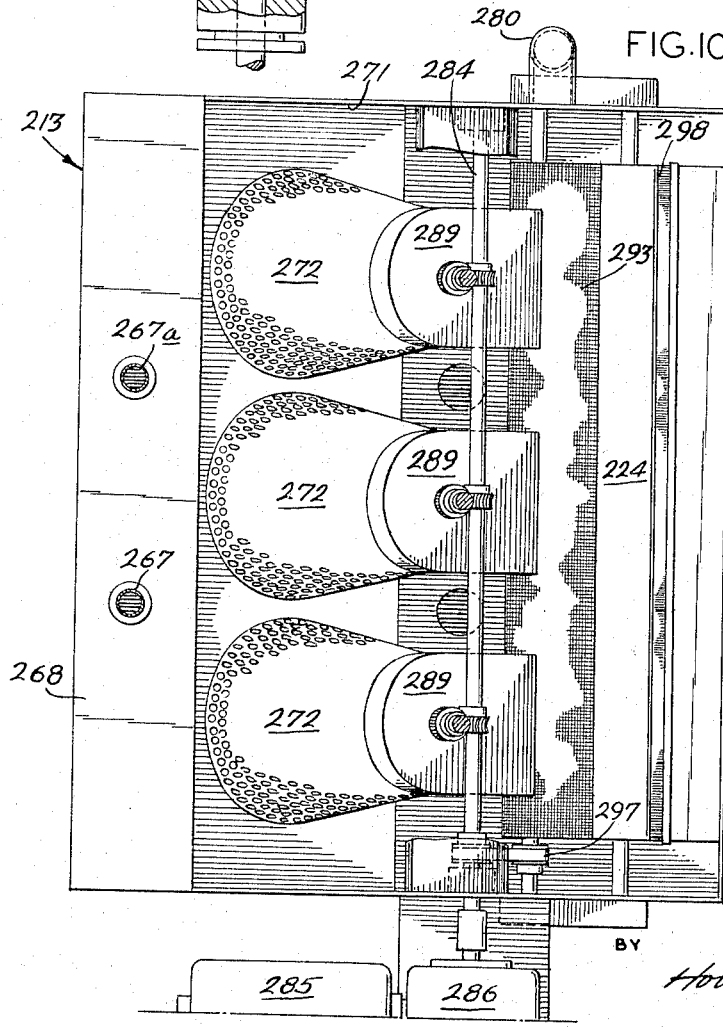
Figure 9:
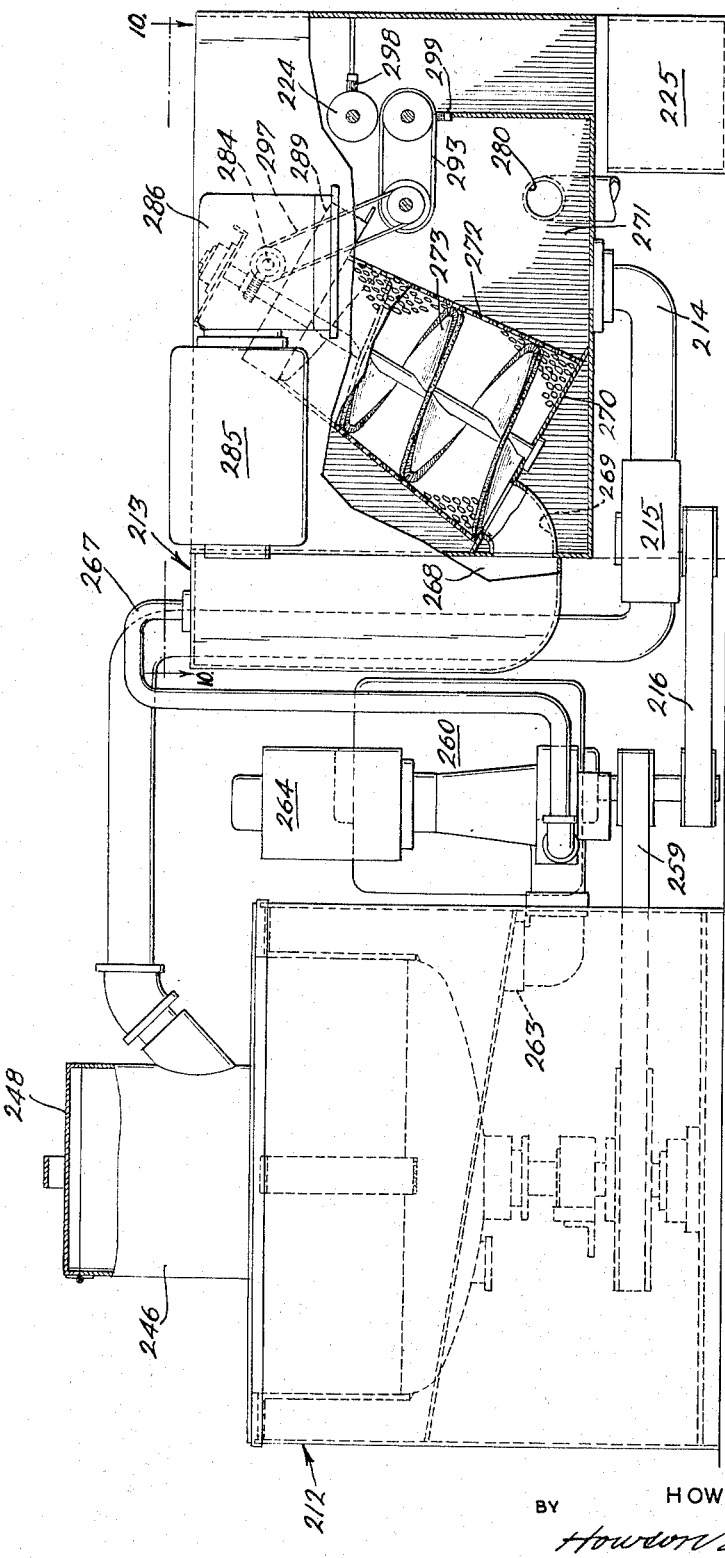
Figure 11:
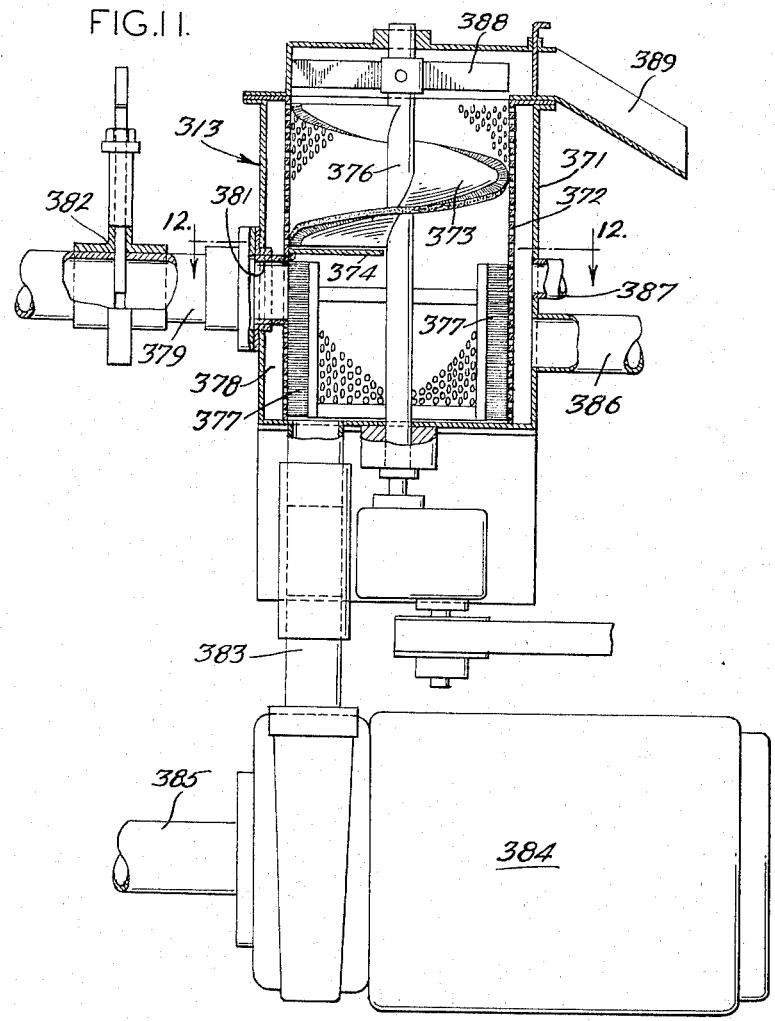
Figure 12:
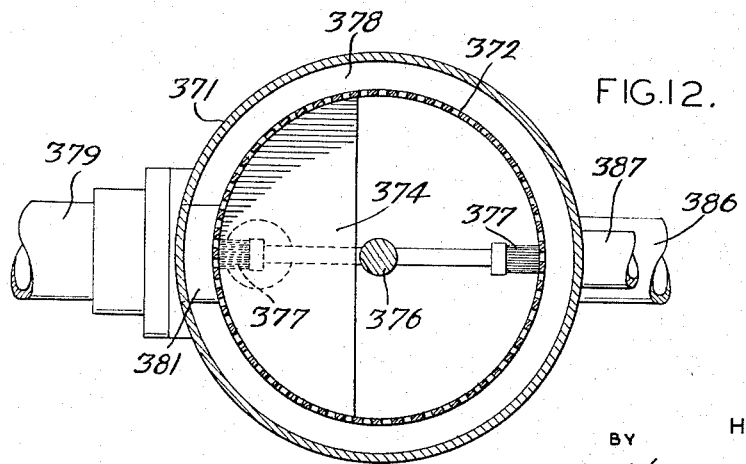
Figure 13:
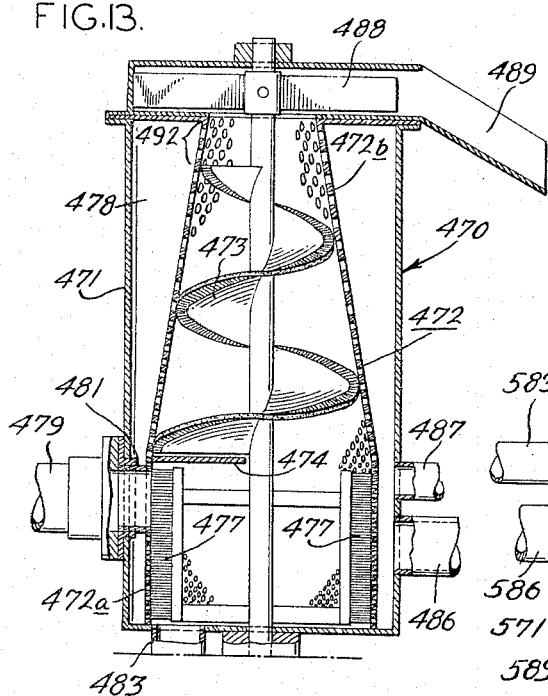
Figure 15:
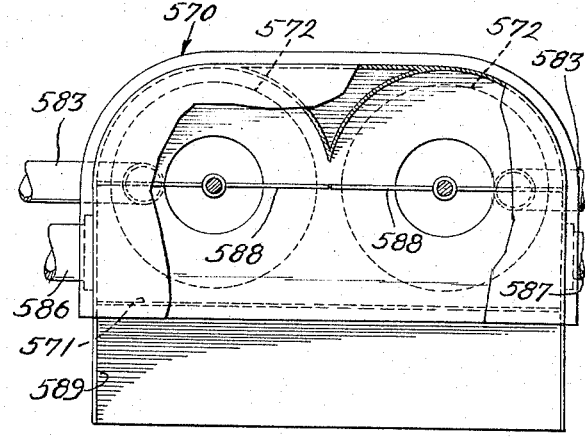
Figure 14:
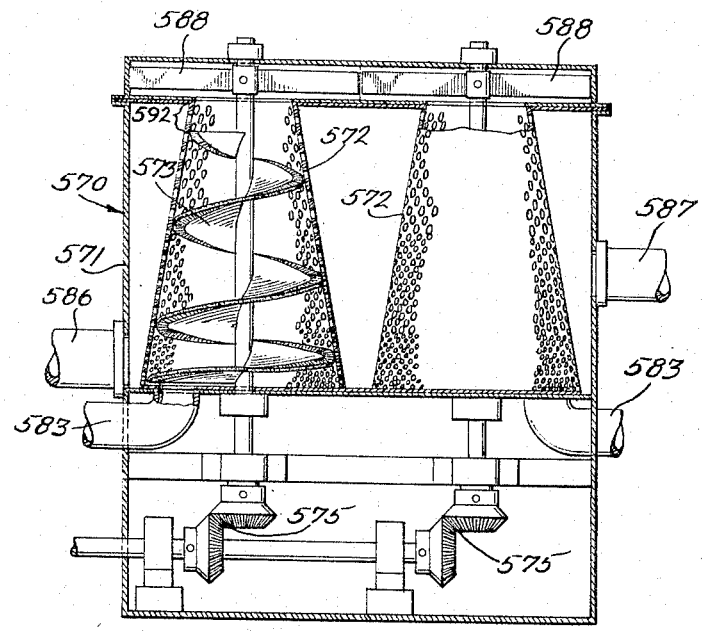

FIGS. 3 and 4 are enlarged sectional views taken on the lines 3—3 and 4—4 respectively of FIG. 2;

FIG. 5 is a view similar to FIG. 1 showing a further embodiment of the present invention;

FIG. 6 is a sectional view similar to FIG. 3, but of the embodiment shown in FIG. 5;

FIG. 7 is a fragmentary sectional view of the apparatus of FIG. 6 taken in a horizontal plane below the cover element thereof;

FIG. 8 is a sectional view of the separator shown in FIG. 5;

FIG. 9 is a view similar to FIG. 1 of a further embodiment of the present invention;

FIG. 10 is a sectional view taken on the line 10—10 of FIG. 9;

FIG. 11 is a sectional view of a modified separator similar to that shown in FIG. 8;

FIG. 12 is a sectional view taken on the line 12—12 of FIG. 11;

FIG. 13 is a sectional view similar to FIG. 8 of another separator made in accordance with the invention;

FIG. 14 is a transverse sectional view of still another separator made in accordance with the invention; and FIG. 15 is a plan view with portions broken away of the separator shown in FIG. 14.

Referring now to the drawings and more particularly to the embodiment shown in FIGS. 1 to 4 inclusive, the waste disposal unit disclosed therein comprises a distintegrator 12, which operates to receive the waste material and to combine it with water or another liquid carrier to form a slurry. Associated with the disintegrator 12 is a first separator 13 operable normally to receive the slurry from the disintegrator 12 and to extract therefrom a portion of the water or other liquid carrier and to discharge the deliquefied pulp. The water or other liquid carrier is returned to the unit 12 from the separator 13 through a line 14 having a gate valve 15 therein, and the partially deliquefied pulp is discharged into a line 16 having a diverter 17 associated therewith. The diverter 17 directs the discharge alternatively into a waste line 18 or an inlet line 19 to a second separator 23. The second separator 23 operates to remove additional moisture from the pulp discharged from the separator 13 and includes a squeeze-roll extractor 24 for further extracting water or other liquid carrier from the pulp. The semi-dry pulp from the squeeze-rolls 24 is discharged into a container 25 and the liquid extracted in the unit 23 is either discharged or returned to the unit 12 through a drain line 26.

Referring now to FIGS. 1 to 3 inclusive, the disintegrator 12 comprises an outer housing 31 of generally hollow cylindrical form. A transverse partition 32 is mounted in the housing 31 to support centrally therein the dished bottom section 33 of an interior tank portion 34 mounted coaxial with said housing 31. The partition 32 forms the bottom wall of an annular collecting trough 35 intermediate the tank 34 and the cylindrical housing 31. Support legs 36 extend upwardly from the upper edge of the tank bottom 33 at points spaced circumferentially thereof and are anchored at their upper end adjacent the upper marginal portion of the housing 31. A cover member 41 is mounted on the housing 31 and is sealed thereto by a sealing member 42 engaging the upper peripheral edge of the housing 31.

Depending from the cover member 41 is a foraminous cylindrical portion 43 adapted to engage upon the upper edge of the bottom portion 33 to define the upper portion of the tank 34. As shown in FIG. 3, the upper portion 43 is perforated the full depth of the cylindrical portion, but it has been found that the perforations may be confined to the upper marginal portion of the member 43 without deleteriously affecting the disintegrating action in the tank. The perforations in the portion 43 take the form of drilled holes 45 which determine the maximum particle size of disintegrated material discharged from the tank 34. Centrally of the cover 41 is an upstanding feed tube 46 terminating at its upper end in a tray 47 which serves as a funnel to direct the material to be disintegrated into the body of the tank 34. Surrounding the tubular portion 46 and depending downwardly from the cover member 41 at angles to radial lines are baffle elements 48. In the present instance, there are baffle members located at points 90° apart surrounding the tubular inlet 46. The number and spacing of baffle members may be increased or reduced as the size of the tank is increased or reduced. As shown in broken lines in FIG. 1, the baffle members comprise thin plates having their outer edges spaced closely to the perforated wall 43 and projecting inwardly at a small angle to an imaginary radial line intersecting the outer edge of the baffle and at an angle to the vertical.

Rotatably mounted centrally in the bottom of the tank 34 is a disintegrating impeller disc 51 having a body portion 52 of generally flat form with depending vanes 53 projecting downwardly into close proximity to the dished bottom section 33 and operable upon rotation of the disc 51, to impel the liquid in the tank outwardly along the bottom wall 33 and upwardly across the foraminous upper portion 43 of the tank 34. The upper surface of the body portion 52 is provided with upwardly projecting teeth 55 which impinge against the solid material introduced into the tank to disintegrate the same for intermixture with the liquid carrier in the tank. The impeller disc 51 is mounted in bearings 56 and 57 and is driven, in the present instance, by a pulley 58 and belt drive 59 from a drive means 60. Thus, upon energization of the drive means 60, in the present instance a motor, the impeller disc 51 is rotated to impel the liquid contained in the tank 34 and to disintegrate the material introduced into the tank through the feed tube 46.

The rotation of the impeller disc 51 causes a swirling movement of the liquid in the tank upwardly along the side walls and into contact with the depending baffle members 48 which deflect the solid particles in the swirling liquid mass downwardly against the teeth 55 on the impeller disc thereby further disintegrating the particles. The centrifugal action of the swirling mass causes the heavier particles which are smaller in size than the apertures 45 to flow outwardly through the apertures into the collecting trough 35 in the form of a liquid slurry. The slurry is discharged through an outlet 63 positioned at the lower side of the slanted partition 32 into a pump 64, and then to the separator 13 through suitable piping 67.

The action of the disintegrator operates to reduce most materials to a sufficiently small particle size to flow through the apertures 45, but certain materials may not be disintegrated. Periodically, the apparatus is stopped and non-disintegrated material may be removed manually through the feed tube 46. In the event that certain material may accumulate under the impeller disc 51, a clean-out opening 66 is provided in the bottom wall 34 underlying the impeller into which the small particles which accumulate under the impeller disc are deposited for subsequent removal upon shut-down of the equipment.

The separator 13 as shown in FIGS. 1, 2, and 4 comprises a generally cylindrical casing 71 having a foraminous internal shell 72 spaced inwardly from the wall thereof. A helical screw 73 is mounted concentrically with the shell 72 and is operable to be rotated in unison with the impeller disc 51 by a suitable belt drive 74 from the drive means 60. The free edge of the helical screw 73 is provided with brush portions 76 operable to brush against the foraminous shell 72 to maintain the apertures 77 therein free from clogging. It is noted that the apertures 77 are substantially smaller than the apertures 45 in the disintegrating unit so that the particles in the slurry pumped thereinto are contained in the shell 72 and the liquid carrier is discharged into the annular space 78 intermediate the shell 72 and the casing 71. The annular space 78 communicates with the return line 14 through the gate valve 15 so that the liquid may be continuously recirculated from the unit 12 through the separator 13 back into the unit 12. The rotating screw 73 carries the deliquefied material upwardly into engagement with wiper blades 75 which discharge it into a discharge chute 79. It is noted that the rotation of the screw 73 is at a slower rate than the rotation of the disc 51 so that the slurry inroduced from the pipe 67 is not subjected to outward centrifugal force and the heavier particles in the slurry are therefore not urged outwardly through the openings 77 in the shell 72. The deliquefied material then passes through the pipe 16 to the diverter 17 and may be discharged into the waste line 18 or may be discharged into the second separator 23.

The gate valve 15 regulates the return of the liquid to the disintegrator unit 12. Regulation of the return liquid also controls the fluidity of the pulp discharged into the chute 79. Depending on the character of the material being disintegrated, it may be necessary to increase the fluidity of the pulp in order to permit flow of the pulp through the lines 16, 18, and 19. Where the second separator is closely adjacent the first separator, the pulp may be less fluid than in the installations where the second separator is at a great distance from the first separator. For example, the first separator and the disintegrating unit may be located within the building at the point where the greatest waste accumulation normally occurs, and the second separator may be located at the loading dock or other facility where the semi-dry pulp is to be removed. Where the first separator is below the level of the second separator, or is far removed therefrom, it may be necessary or desirable to incorporate a pump in the line 19 in order to insure discharge of the fluidized pulp from the chute 79 into the second separator 23. To avoid excess accumulation of water in the space 78, an overflow 80 is provided immediately above the level of the return line 14.

When the valve 15 is closed, the slurry from the disintegrator 12 is not reduced in its liquid constituency and is flowed directly to the waste line 18 or to the second separator 23, as the case may be. In such an instance, make-up water is supplied continuously to the disintegrator during its operation in order to maintain the desired liquidity of the material in the tank 34.

Suitable controls (not shown) may be provided to maintain the liquid level in the tank at the desired level so as to insure proper disintegration and flow of material through the apparatus, although a skilled operator can determine the condition of the liquid level in the unit by normal observation techniques.

The separator 23 is similar in construction to the separator 13, comprising an outer casing 81 with an interior shell 82 having a screw 83 and wiper 85 cooperating therewith to extract the liquid from the pulp and to discharge the pulp into a chute 89. The annular space between the housing 81 and the shell 82 opens into a tank 88 having the drain line 26 connected thereto. The screw 83 is driven by a motor 80 through a gear train 84. From the chute 89, the deliquefied pulp is deposited on a screen conveyor 93 which carries the pulp to the squeeze rolls 24 which extract further liquid therefrom and discharges the semi-dry pulp into the container 25, the extracted liquid flowing into the tank 88 from which it is discharged through the drain 26. The conveyor 93 is driven from the gear train 84 through a belt drive 94 as shown in FIGS. 1 and 2.

The embodiment shown in FIGS. 5 to 8 inclusive is similar in many respects to the embodiment described above in connection with FIGS. 1 to 4. In this embodiment, a disintegrator unit 112 is shown which is particularly adapted to be used in a scullery or the like, for receiving trash and garbage, to combine it with water and to discharge it in the form of a slurry. From the unit 112, the slurry is advanced to a separator 113 which operates to extract from the slurry a portion of the water or other liquid carrier. The separator 113 also is operable to divert the slurry directly into a waste line 118 controlled by a valve 117. When the valve 117 is closed, the separator operates to separate a portion of the liquid from the pulp and return the liquid to the disintegrating unit 12 through a return line 114, the pulp being discharged into a container 125.

As shown in FIGS. 5 to 7, the disintegrator 112 comprises an outer housing 131 having a slanting transverse partition 132 mounted therein to support the dished bottom section 133 of an interior tank portion 134. The portion 133 is additionally supported by legs 136 extending upwardly from the upper edge of the portion and secured to the housing 131 at their upper extremity. A cover member 141 is sealingly mounted on the housing 131 and includes a depending cylindrical portion 143 which may be secured to the legs 136 as indicated at 142. Baffle members 148, in the present instance two in number, depend from the cover 141 in close proximity to the foraminous portion 143. As shown, the baffle members comprise thin arcuate plates disposed at a small angle to an imaginary radial line therethrough and at an angle to the vertical as clearly shown in FIGS. 6 and 7. A tubular inlet 146 projects upwardly from the cover 141 and terminates in a tray 147 which may constitute the countertop in a scullery or the like. A removable cover element 148 is provided to close the inlet tube 146.

A disintegrating impeller disc 151 is rotatably mounted in the bottom portion 133 and comprises a substantially flat body portion 152 having depending vanes 153 on its lower surface. The upper surface of the disc 151 is provided with upstanding teeth 155 which, are cast integral with support plates 156 in the form of quadrants secured to the body portion 152, for example by fasteners 157. By this construction, in the event of damage to the teeth 155 in a localized area, the associated quadrant 156 may be removed from the body portion 152 and replaced. The impeller disc 151 is driven by a belt drive 159 from a suitable drive means 160, in the present instance a motor.

The motor 160 operates to drive the impeller 151 to disintegrate the material fed into the tank 134 so as to intermix the same with the liquid carrier in the tank and to discharge the slurry formed in the tank through the perforated portion 143 into a collecting trough 135 formed between the housing 131 and the portion 136. The slurry in the trough 135 is discharged through a drain 163 and is pumped to the separator 113 by a pump 164 having a discharge line 167 associated therewith.

As best illustrated in FIG. 8, the separator 113 comprises a cylindrical housing 171 having a perforated cylindrical shell 172 mounted interiorly thereof. As shown, the shell 172 is perforated in the upper portion and is flared outwardly at its lower end to accommodate a greater quantity of slurry from the line 167. As shown, the drain line 118 is connected through the housing 171 to an aperture 175 in the shell 172. Thus, when the valve 117 is open, the slurry is free to flow into the shell 172 through the aperture 175 into the drain line 118 without substantial deliquefication, the opening in the drain line being positioned below the return line opening 176 in the housing 171.

A screw 173 is mounted in the shell 172, and in the present instance, extends only from the top of the shell 172 down to the midpoint thereof as shown. The screw 173 is provided with a brush about its periphery as indicated at 177 and is further provided with a cleaning brush 178 depending therebelow to maintain the drain opening 175 and the perforations in the shell free from clogging or the like. A wiper 174 is mounted for rotation with the screw 173 to discharge the pulp into a chute 179.

When the drain line is closed by the valve 117, the slurry pumped into the interior of the shell 172 is deliquefied and the deliquefied pulp therefrom is discharged by the screw into the chute 179 from which it is discharged into the container 125. The liquid from the slurry flows outwardly into the space between the housing 171 and the shell 172 from which it is returned to the disintegrator through the opening 176 and the return line 114. An overflow 180 is provided above the opening 176 to prevent flooding of the separator. The impeller 173 is driven through a gear train 184 from a belt drive 185 connected to the drive means 160. It should be noted that if the separator 113 is positioned below the level of the disintegrator 112, the pump 164 is eliminated and a return pump is mounted in the return line 114 to effect the recirculation of the liquid carrier.

In the embodiment shown in FIGS. 9 and 10, a disintegrator 212 discharges into a separator 213 having a return line 214 and a squeeze-roll extractor 224 operable to discharge the deliquefied pulp into a container 225. The disintegrator 212 is similar to the disintegrator 112, being driven by a motor 260 through a belt 259 and having a pump 264 connected between a drain 263 and a discharge line 267 leading to the separator 213. A feed tube 246 for the disintegrator is provided with a pivoted cover element 248.

The separator 213 receives the discharge from the disintegrating unit 212 through the discharge line 267 and a sump 268. The separator 213 is equipped to receive the discharge from a plurality of disintegrating units 212 and to this end, a second discharge line 267a is shown in FIG. 10, leading from a second disintegrator (not shown) into the sump 268. The separator 213 includes a casing 271 having mounted therein several, in the present instance three, tapered generally-cylindrical foraminous shells 272. The interiors of the shells 272 communicate with the sump 268 through inlets 269 connected to openings in the bottom walls 270 of the shells 272. The shells 272 are mounted with their axes inclined to the vertical and are provided with screws 273 extending the full length thereof and having brushed peripheries in brushing engagement with the shells 272.

The screws 273 are driven from a common drive shaft 284 connected to a drive motor 285 through a gear train 286. Upon rotation of the screws 273, the pulp is separated from the liquid carrier, the liquid flowing through the foraminous shells 272 into the housing 271 and the pulp being discharged through chutes 289 onto a common screen conveyor 293. The liquid in the housing 271 is returned to the disintegrating unit through the return line 214 by a pump 215 driven from the drive means 260 by a belt drive 216. An overflow 280 is provided to prevent over-accumulation of water in the housing. The screen conveyor 293 advances the deliquefied pulp to the squeeze-rolls 224 which extract additional water therefrom and afford discharge of the pulp into the container 225. The conveyor 293 is driven by a belt connection 297 to the drive shaft 284 as shown. Scraper brushes 298 and 299 are provided in association with the squeeze-rolls 224 to facilitate discharge of the pulp into the container 225.

In lieu of the separators described above, a separator such as shown in FIGS. 11 and 12 may be employed. This embodiment 313 of separator is similar in many respects to the separator 113 described above. To this end, the separator comprises a casing 371 of generally cylindrical form having an interior perforated cylindrical shell 372 spaced inwardly from the casing 371 to define therebetween an annular discharge chamber 378. Cooperating with the shell 372 is a screw 373 extending from the top of the shell to approximately the midpoint thereof. Immediately below the screw 373 is a partition 374 which, as shown in FIG. 12, is approximately semi-circular in form extending approximately halfway across the cross sectional area of the shell 372. Spaced below the partition 374 and mounted for rotation on the drive shaft 376 of the screw 373 are brush elements 377 operable to brush against the lower portion of the shell 372 to maintain the perforations free for the flow of liquid therethrough. Immediately below the partition 374 a waste line 379 communicates with the interior of the shell through an aperture 381. The flow of slurry from the interior of the shell 372 through the waste line 379 is controlled by a gate valve 382 as shown. The slurry is introduced into the separator 313 by a discharge tube 383 from a pump 384 connected to this disintegrating apparatus by a line 385. The slurry introduced into the interior of the shell 372 is partially deliquefied by the liquid carrier passing through the perforations in the shell 372 and being returned to the disintegrating unit through a return line 386 or to a waste line, as desired.

When the valve 382 is closed to preclude the discharge of slurry through the discharge opening 381, the force of the slurry within the shell 372 carries it into engagement with the screw 373 which expresses the deliquefied pulp into engagement with the wiper 388 which wipes the pulp into the discharge chute 389 from which it may pass to further liquid extractors or to a waste container, as desired. It is noted that the return line 386, in this instance, is below the level of the discharge opening 381 so that a portion of the liquid is free to return to the disintegrating unit, even when the valve 382 is open to discharge the slurry to the waste line 379. An overflow 387 is positioned above the return line 386 to prevent flooding of separator.

Where it is desired to remove a maximum amount of the liquid carrier in a single separator, a unit 470 such as shown in FIG. 13, may be connected to the outlet of a disintegrator. The separator comprises a casing 471 having foraminous generally cylindrical shell 472 spaced inwardly of the casing 471 to define a discharge chamber 478. The shell has a lower straight-walled portion 472a and an upper tapered portion 472b. At the junction of the portions 472a and 472b is a transverse partition 474 of generally semi-circular form extending approximately halfway across the cross-sectional area of the shell.

Cooperating with the tapered portion 472b is a screw 473 having a brushed periphery, and cooperating with the straight portion 472a are brush elements 477.

The highly-fluid slurry is introduced into the interior of the shell by an inlet 483. To permit discharge of the slurry without substantial deliquefication, a waste line 479 communicates with the interior of the shell through an opening 481 located immediately below the partition 474. A gate valve (not shown) in the line 479 controls the flow through the opening 481. When the valve is closed, the slurry is deliquefied and the resulting pulp is discharged into engagement with a wiper 488 which discharges it into the chute 489. The separated liquid flows into the chamber 478 from which it is returned to the disintegrator by a return line 486. An overflow 487 is positioned above the opening to the line 486 to prevent flooding of the separator.

In order to remove a maximum amount of the liquid from the pulp, the screw 473 terminates in spaced relation to the wiper 488 below the upper end of the shell portion 472b, leaving a free space 492. In the operation of the separator, the slurry is gradually reduced in fluidity as it is advanced upwardly in the shell. The advance in the lower portion 472a is effected by the fluid pressure of the incoming slurry. Above the partition 474, the screw expresses the pulp upwardly at it rotates. In the free space 492 the pulp is compacted into the form of a plug by upward push of the pulp expressed by the screw 473. This compaction of the pulp squeezes the contained water or other liquid outwardly through the perforations in the shell. The compacted plug of pulp is gradually pressed upwardly into engagement with the wiper 488 which discharges the pulp into the chute 489.

In the present instance, the perforation in the shell 472 are graduated in size. In the straight-wall portion 472a, where the slurry is highly fluid, the perforations are relatively small, for example $\frac{1}{16}$ inch diameter. In the lower half of the tapered portion 472b, the perforations are larger, for example $\frac{1}{8}$ inch diameter. In the upper half of the portion 472b, the perforations are still larger, for example $\frac{1}{4}$ inch diameter. It has been found that as the pulp becomes less fluid, it attains greater cohesion which retards it from passing outwardly through the larger perforations. Thus, the larger perforations permit greater freedom for the discharge of the separated water without adversely affecting the dewatering action.

FIGS. 14 and 15 illustrate a gang separator 570 similar to that shown in FIGS. 9 and 10 and employing certain novel principles embodied in the separator of FIG. 13. To this end, the separator 570 comprises a casing 571 having a pair of foraminous tapered generally cylindrical shells 572 having screws 573 cooperating therewith. In the present instance, the axes of the shells and screws are vertical, the screws being driven at their lower ends by suitable driving connections 575.

As shown in FIG. 14, the perforations in the shell are graduated in size, the lower $\frac{1}{3}$ of the shell having small holes, the middle $\frac{1}{3}$ of the shell having medium holes, and the upper $\frac{1}{3}$ having large holes.

In the operation of this separator, the slurries from the grinder or disintegrators are introduced into the interiors of the shells 572 through inlets 583. The liquid carriers pass through the shells into casing 571 from which it is returned to the disintegrators through a return outlet 586. An overflow is provided at 587 to prevent flooding of the casing. The dewatered pulp is pressed upwardly by the rotary screws 573 and is compacted to plug form in the free spaces 592 above the screws 573. The upward push of the pulp expresses the plugs upwardly into engagement with the wipers 588 which discharge the deliquefied pulp into the chute 589.

While various embodiments of the present invention have been illustrated and described, it should be apparent that changes and modifications may be made therein and thereto. For example, the various separators may be used with other disintegrating units, for example the unit shown in my earlier patent and the various elements shown and described may be combined in any desired manner to produce the results desired. The present invention is particularly adapted to shipboard use wherein at times it is desirable to discharge the entire slurry to the waste line of the ship while the ship is at sea and to dewater the slurry to form a deliquefied pulp which is more readily disposed of while in port so as to avoid contamination of the port with the discharge. The mounting of the foraminous upper portion of the disintegrating tank in a removable manner facilitates change of aperture size to enable a unit to be used efficiently for disposing of both unclassified waste material and classified waste material. In some instances where there is a need for reducing the aperture size for only a short period, screening may be mounted against the inside wall of the foraminous upper section of the tank in the disintegrating unit to reduce the size of the apertures as required.

Other changes and modifications may be made to the disclosure without departing from the invention, as defined in the appended claims.

I claim:

1. Apparatus for disintegrating solid materials and mixing the same with a liquid carrier to form a slurry, comprising a housing, an interior tank within said housing having a dished bottom section and a foraminous upper section, inlet means to introduce said solid materials and said liquid carrier into said tank, a disintegrating impeller disc rotatably mounted in said tank to effect said disintegration and mixture, said impeller disc having disintegrating teeth projecting upwardly therefrom and vanes depending downwardly into close proximity to said dished bottom section operable upon rotation of the disc to impel the slurry comprised of the liquid carrier and disintegrated solid material outwardly along the bottom section and upwardly across the foraminous upper section in a swirling movement, said foraminous upper section affording discharge of said slurry into said housing, and baffle means operable to deflect non-distintegrated particles of said solid material in said slurry downwardly against said impeller disc to be disintegrated thereby, the improvement wherein said bottom section is permanently mounted in said housing, said mounting comprising a transverse partition in said housing forming with said housing a collecting trough surrounding said upper foraminous portion to receive the slurry discharged through the latter, and support legs mounted on said housing adjacent their upper ends and engaging at their lower ends said bottom section adjacent its junction with said upper section, said upper section comprising a hollow cylindrical shell releasably mounted within said support legs and engaging said bottom section to constitute a continuation thereof.

2. Apparatus according to claim 1 including a cover member sealingly and releasably mounted on the upper end of said housing to close said collecting trough, said hollow cylindrical shell being closed at its upper end by said cover member, said inlet means comprising a tubular opening centrally of said cover member to afford introduction of solid material into the tank within said shell.

3. Apparatus according to claim 2 wherein said baffle means comprises a plurality of thin plate members mounted in circumferentially-spaced relation and projecting downwardly into said tank within said shell to intersect the swirling mass of liquid created by rotation of said impeller disc.

4. Apparatus according to claim 3 wherein said thin plate members are disposed at angles to radial lines of said shell so as to deflect said particles downwardly against said disc and said slurry outwardly through said shell.

5. Apparatus according to claim 1 wherein said disc comprises a flat body portion and said teeth are cast integral with support plates releasably secured to said body portion.

6. Apparatus according to claim 5 wherein said support plates are in the form of quadrants of uniform size and shape.

7. Apparatus for disposing of solid materials by disintegrating the same into the form of pulp comprising disintegrator operable to disintegrate the solids and mix the same with a liquid carrier and a separator to deliquefy the mixture; said disintegrator comprising a housing, an interior tank within said housing having a dished bottom section and a foraminous upper section, inlet means to introduce said solid materials and said liquid carrier into said tank, a disintegrating impeller disc rotatably mounted in said tank to effect said disintegration and mixture, said impeller disc having disintegrating teeth projecting upwardly therefrom and vanes depending downwardly into close proximity to said bottom section operable upon rotation of the disc to impel the slurry comprised of the liquid carried and disintegrated solid material outwardly along the bottom section and upwardly across the foraminous upper section in a swirling movement, said foraminous upper section affording discharge of said slurry into said housing, and baffle means operable to deflect particles in said slurry downwardly against said impeller disc to be disintegrated thereby; said separator comprising a casing, an upright foraminous generally cylindrical shell, means to introduce slurry from said housing into the interior of said shell at the bottom thereof, a screw in scraping engagement with said shell and mounted for rotation therein, said shell being open at the top to afford discharge of deliquefied pulp therefrom upon rotation of said screw, said liquid carrier flowing outwardly through said shell, and conduit means to return said liquid carrier from said casing into said tank of the disintegrator to effect recirculation thereof; the improvement comprising a second separator operable to receive the deliquefied pulp from said first-mentioned separator, a waste line to discharge said pulp, and diverter means intermediate said first and second separators operable to direct the deliquefied pulp from said first separator alternatively to said second separator or to said waste line.

8. Apparatus according to claim 7 including valve means in said return conduit means to regulate the amount of liquid returned to said disintegrator and therefore the liquid content of the pulp discharged from said first separator to thereby insure proper flow of said pulp through said diverter.

9. Apparatus according to claim 7 wherein said second separator includes a pair of squeeze rolls operable to receive the pulp and extract further liquid therefrom.

10. Apparatus for disposing of solid materials by disintegrating the same into the form of pulp comprising a disintegrator operable to disintegrate the solids and mix the same with a liquid carrier and a separator to deliquefy the mixture; said disintegrator comprising a housing, an interior tank within said housing having a dished bottom section and a foraminous upper section, inlet means to introduce said solid materials and said liquid carrier into said tank, a disintegrating impeller disc rotatably mounted in said tank to effect said disintegration and mixture, said impeller disc having disintegrating teeth projecting upwardly therefrom and vanes depending downwardly into close proximity to said bottom section operable upon rotation of the disc to impel the slurry comprised of the liquid carrier and disintegrated solid material outwardly along the bottom section and upwardly across the foraminous upper section in a swirling movement, said foraminous upper section affording discharge of said slurry into said housing, and baffle means operable to deflect particles in said slurry downwardly against said impeller disc to be disintegrated thereby; said separator comprising a casing, an upright foraminous generally cylindrical shell, means to introduce slurry from said housing into the interior of said shell at the bottom thereof, a screw in scraping engagement with said shell and mounted for rotation therein, said shell being open at the top to afford discharge of deliquefied pulp therefrom upon rotation of said screw, said liquid carrier flowing outwardly through said shell, and conduit means to return said liquid carrier from said casing into said tank of the disintegrator to effect recirculation thereof, the improvement comprising a discharge opening in the shell of said separator in advance of said screw, a discharge line connected to said opening to receive pulp discharged therethrough, and a shut-off means in said line operable when open to render said separator ineffective and to discharge said pulp while in a liquefied state, and operable when closed to render said separator operable to deliquefy the pulp and discharge it at the upper end of said screw.

11. Apparatus according to claim 10 wherein the flight of said screw extends between the midsection and the upper end of said shell and including a brush engaging said shell below said screw flight to maintain the discharge opening and the perforations therein clear for the flow of liquid therethrough.

12. Apparatus according to claim 11 wherein the flight of said screw at said upper end terminates at a point spaced below the upper terminus of said foraminous shell so as to leave a free space within said shell in which the pulp advanced upwardly by said flight is compacted.

13. Apparatus according to claim 12 wherein said shell is tapered between said midsection and its upper terminus and is straight-walled therebelow.

14. Apparatus according to claim 10 wherein the perforations in said shell are graduated in size, the perforations in the lowermost portion being smaller and the perforations in the uppermost portion being larger.

15. Apparatus for disposing of solid materials by disintegrating the same into the form of pulp comprising a disintegrator operable to disintegrate the solids and mix the same with a liquid carrier and a separator to deliquefy the mixture; said disintegrator comprising a housing, an interior tank within said housing having a foraminous section, and means in said tank to effect said disintegration and mixture, said foraminous section affording discharge of said mixture from said tank into said housing; said separator comprising a casing, an upright foraminous generally cylindrical shell, means to introduce the mixture from said housing into the interior of said shell at the bottom thereof, a screw in scraping engagement with said shell and mounted for rotation therein, said shell being open at the top to afford discharge of deliquefied pulp therefrom upon rotation of said screw, said liquid carrier flowing outwardly through said shell, and conduit means to return said liquid carrier from said casing into tank of the disintegrator to effect recirculation thereof, the improvement comprising a discharge opening in the shell of said separator in advance of said screw, a discharge line connected to said opening to receive pulp discharged therethrough, and a shut-off means in said line operable when open to render said separator ineffective and to discharge said pulp while in a liquefied state, and operable when closed to render said separator operable to deliquefy the pulp and discharge it at the upper end of said screw.

16. Apparatus for disposing of solid materials by disintegrating the same into the form of pulp comprising a disintegrator operable to disintegrate the solids and mix the same with a liquid carrier and a separator to deliquefy the mixture; said disintegrator comprising a housing, an interior tank within said housing having a foraminous section, and means in said tank to effect said disintegration and mixture, said foraminous section affording discharge of said mixture from said tank into said housing; said separator comprising a casing, an upright foraminous generally cylindrical shell, means to introduce the mixture from said housing into the interior of said shell at the bottom thereof, a screw in scraping engagement with said shell mounted for rotation therein, said shell being open at the top to afford discharge of deliquefied pulp therefrom upon rotation of said screw, said liquid carrier flowing outwardly through said shell, and conduit means to return said liquid carrier from said casing into said tank of the disintegrator to effect recirculation thereof, the improvement wherein said foraminous shell is tapered upwardly and the perforations of said foraminous shell are graduated in size, the larger perforations being in the smaller upper end of it and the small perforations being in the larger lower end of it.

17. Apparatus for disposing of solid materials by disintegrating the same into the form of pulp comprising a disintegrator operable to disintegrate the solids and mix the same with a liquid carrier and a separator to deliquefy the mixture; said disintegrator comprising a housing, an interior tank within said housing having a foraminous secton, and means in said tank to effect said disintegration and mixture, said foraminous section affording discharge of said mixture from said tank into said housing; said separator comprising a casing, an upright foraminous generally cylindrical shell, means to introduce the mixture from said housing into the interior of said shell at the bottom thereof, a screw in scraping engagement with said shell and mounted for rotation therein, said shell being open at the top to afford discharge of deliquefied pulp therefrom upon rotation of said screw, said liquid carrier flowing outwardly through said shell, and conduit means to return said liquid carrier from said casing into said tank of the disintegrator to effect recirculation thereof, the improvement wherein said screw extends between the midsection and the upper end of said shell and including clearing means below said screw to maintain the perforations of said foraminous shell below its midsection clear for the flow of liquid therethrough, and a partition extending approximately halfway across the cross-sectional area of said shell intermediate said screw and said clearing means, said mixture-introducing means comprising a discharge tube inlet in the bottom of said shell underlying said partition.

References Cited

UNITED STATES PATENTS

| 2,970,776 | 2/1961 | Buckman | 241—46 |
| 3,062,129 | 11/1962 | Wandel | 100—117 X |
| 3,126,818 | 3/1964 | Koelsch | 100—117 X |
| 3,164,329 | 1/1965 | Wandel | 241—74 |
| 3,176,606 | 4/1965 | Zoffmann | 100—117 X |
| 3,188,942 | 6/1965 | Wandel | 100—96 X |
| 3,191,872 | 6/1965 | Dyson | 241—74 |

BILLY J. WILHITE, *Primary Examiner.*